(12) United States Patent
Olesiewicz et al.

(10) Patent No.: US 7,729,113 B2
(45) Date of Patent: Jun. 1, 2010

(54) HARD DISK DRIVE BRACKET DAMPING MECHANISM

(75) Inventors: Timothy W. Olesiewicz, Dublin, CA (US); Brett C. Ong, San Jose, CA (US); William A. De Meulenaere, Newark, CA (US)

(73) Assignee: Oracle America, Inc., Redwood Shores, CA (US)

( * ) Notice: Subject to any disclaimer, the term of this patent is extended or adjusted under 35 U.S.C. 154(b) by 48 days.

(21) Appl. No.: 12/141,877

(22) Filed: Jun. 18, 2008

(65) Prior Publication Data

US 2009/0316349 A1    Dec. 24, 2009

(51) Int. Cl.
*H05K 7/12* (2006.01)
(52) U.S. Cl. ............. 361/679.34; 361/679.33; 361/679.37; 312/332.1
(58) Field of Classification Search ............ 361/679.34, 361/679.33, 679.37; 312/332.1
See application file for complete search history.

(56) References Cited

U.S. PATENT DOCUMENTS

| 6,067,225 | A | * | 5/2000 | Reznikov et al. | 361/679.31 |
| 6,097,604 | A | * | 8/2000 | Hunter et al. | 361/727 |
| 6,359,836 | B1 | * | 3/2002 | Sevier et al. | 361/725 |
| 6,487,071 | B1 | * | 11/2002 | Tata et al. | 361/679.34 |
| 2008/0266780 | A1 | * | 10/2008 | Olesiewicz et al. | 361/685 |

* cited by examiner

*Primary Examiner*—Jayprakash N Gandhi
*Assistant Examiner*—Ingrid Wright
(74) *Attorney, Agent, or Firm*—Osha • Liang LLP

(57) ABSTRACT

A Hard Disk Drive ("HDD") bracket has a HDD bracket lever having an open position and a closed position, a side bracket, and a HDD bracket damping mechanism. The HDD bracket damping mechanism has an actuation mechanism slidably disposed within the side bracket, and a compressible insert disposed within the side bracket. The compressible insert has a surface abutting the actuation mechanism. When the HDD bracket lever is in the closed position, the actuation mechanism exerts pressure on the compressible insert such that the compressible insert protrudes from the side bracket.

9 Claims, 5 Drawing Sheets

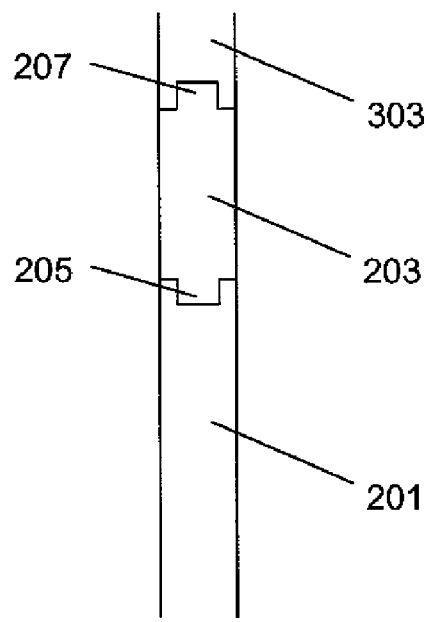 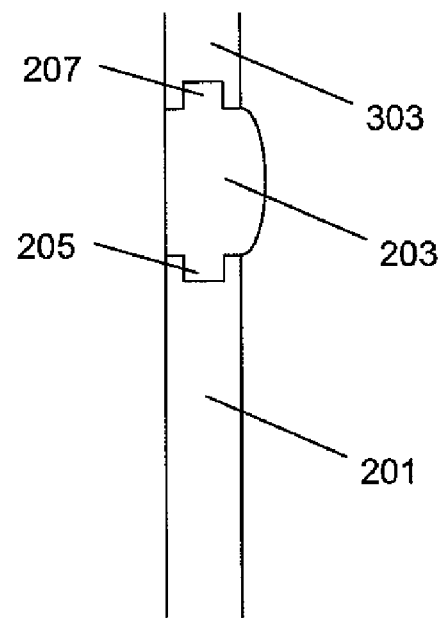
FIG. 5(a)  FIG. 5(b)

HARD DISK DRIVE BRACKET DAMPING MECHANISM

BACKGROUND

FIG. 1 shows a typical computer server rack 10 with blade servers 20 disposed therein. FIG. 2 shows a perspective view of an individual blade server 20. As can be seen in FIGS. 1 and 2, the computer servers 20 are thin, and there is very little tolerance between the individual blade servers 20 within the computer server rack 10, as well as between the blade servers and the server rack.

Over time, as the performance of rack mounted computer systems has increased, the amount of heat generated by various computer system components has increased. This, in turn, requires enhanced cooling to maintain required operating temperatures. The most common approach to computer system cooling is the use of fans. However, with the ever-increasing power budget and space constraints of rack mounted computer systems, available cooling solutions are limited. Because space constraints restrict the physical size of fans, a common solution is the use of fans with high revolutions per minute (RPM). However, high RPM fans significantly increase the amount of vibration generated throughout the computer system.

Because of these height constraints and, accordingly, the fact that there is little or no clearance between the fan and the server enclosure, vibration generated by the fan is transferred through the support structure to other components within the computer system. The generated vibration transferred throughout the computer system can negatively impact the performance of the other components. For example, Hard Disk Drives (HDD) also present in the computer system may be highly sensitive to vibrations and, thus, the performance thereof can be degraded by the transferred vibration from the fan. The problem has been compounded by the increasing density of HDDs, because the HDDs' sensitivity to vibration is also increased.

One way to alleviate the vibration issue would be to mechanically dampen the HDDs. However, the drive brackets are designed to be easily removable, and thus, increased tolerance would be necessary to allow for easy removal and insertion of the HDD brackets from the server rack. Further, increasing the tolerance would allow for increased vibration of the HDDs with respect to the system. This invariably results in throughput degradation of the HDDs. More aggressive forms of damping, in addition to increased cost and complexities of implementation, may interfere with the insertion and removal of the HDD modules from the disk cage.

SUMMARY OF INVENTION

In one or more embodiments of the present invention, a HDD bracket comprises a HDD bracket lever having an open position and a closed position, a side bracket, and an HDD bracket damping mechanism. An actuation mechanism is slidably disposed within the side bracket. A compressible insert is disposed within the side bracket, and has a surface abutting the actuation mechanism. When the HDD bracket lever is in the closed position, the actuation mechanism exerts pressure on the compressible insert such that the compressible insert protrudes from the side bracket.

Other aspects and advantages of the invention will be apparent from the following description and the appended claims.

BRIEF DESCRIPTION OF DRAWINGS

FIGS. 5(a) and 5(b) show a top cross-sectional view of the HDD damping mechanism with the HDD bracket lever in the open position and the closed position according to one or more embodiments of the present invention.

DETAILED DESCRIPTION

Figure 1:
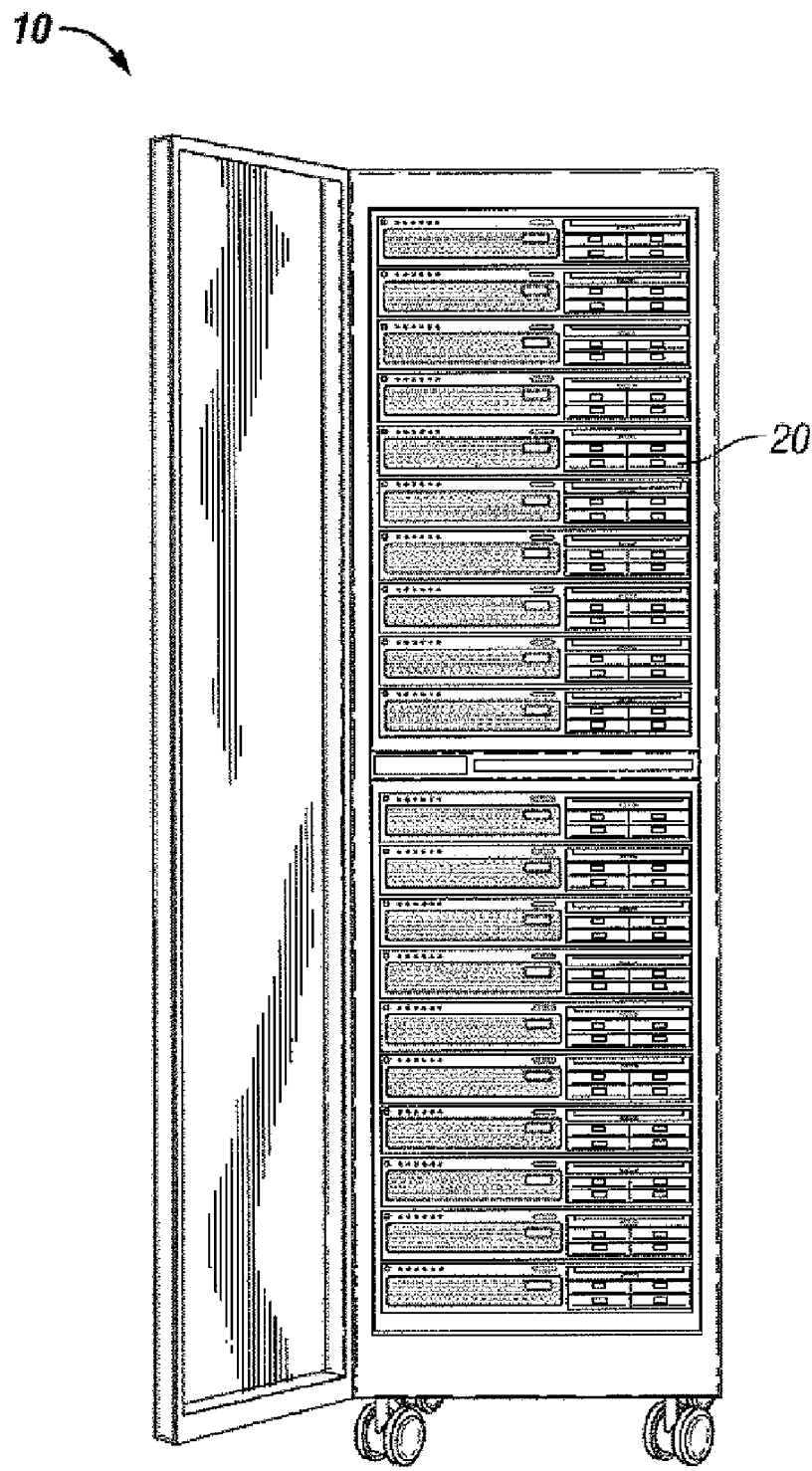
FIG. 1 shows a computer server rack with computer servers disposed therein.
Figure 2:
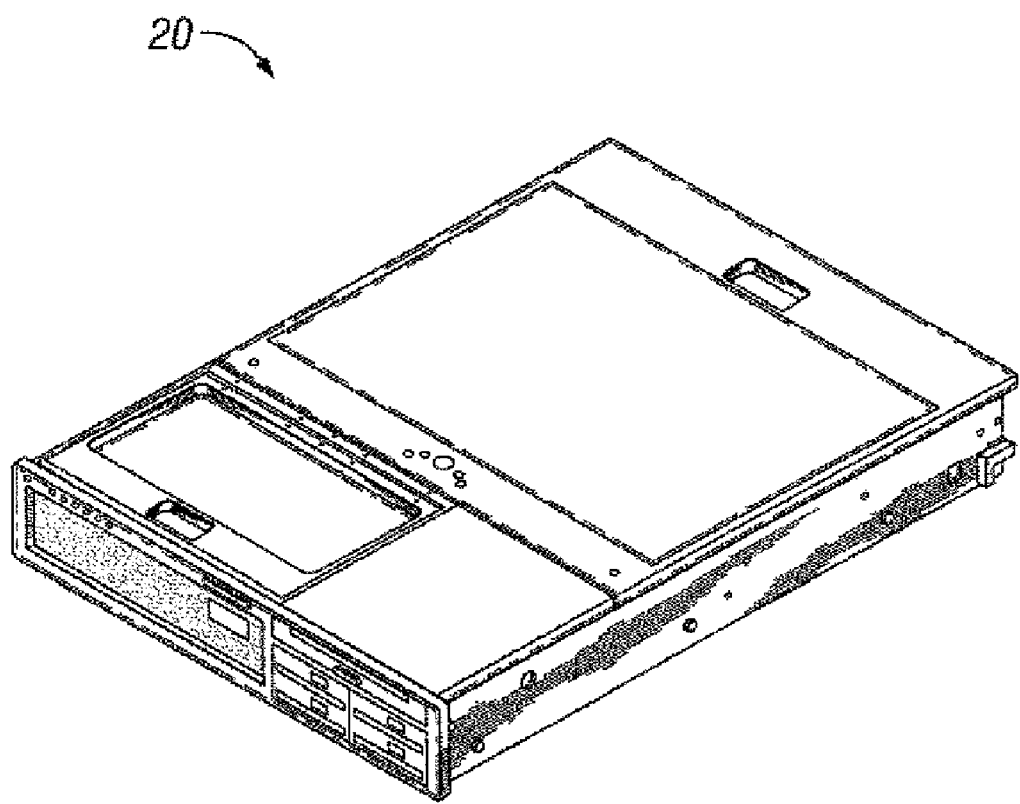
FIG. 2 shows a computer server.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 3:
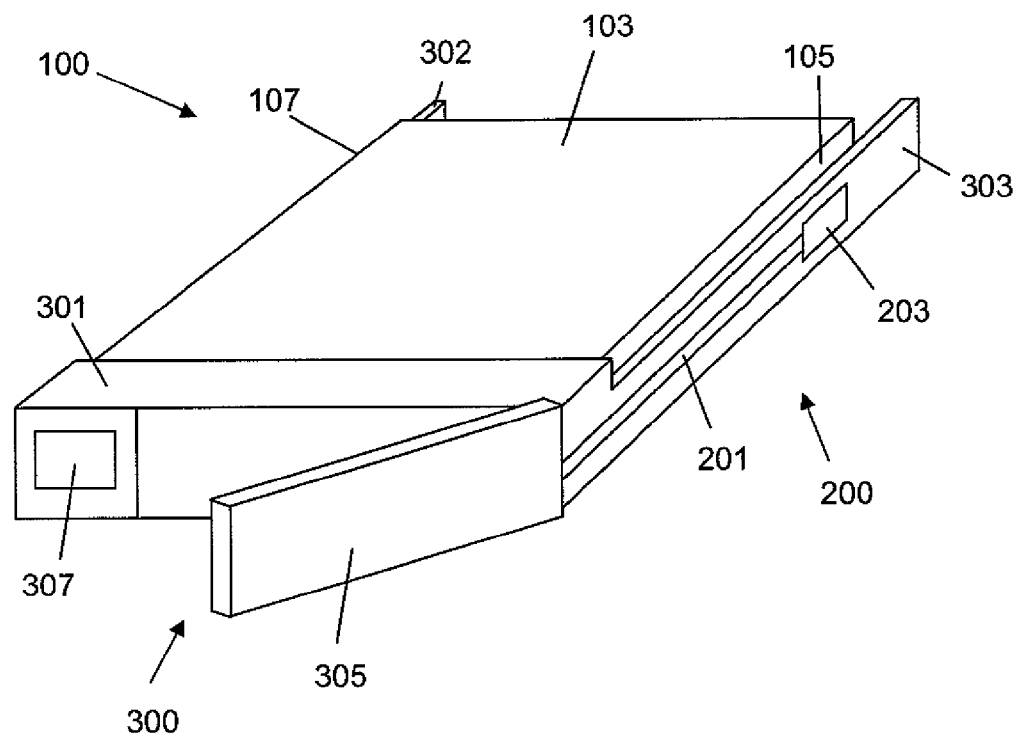
FIG. 3 shows a perspective view of a HDD having a HDD damping mechanism with the HDD bracket lever in the open position according to one or more embodiments of the present invention.
Figure 4:
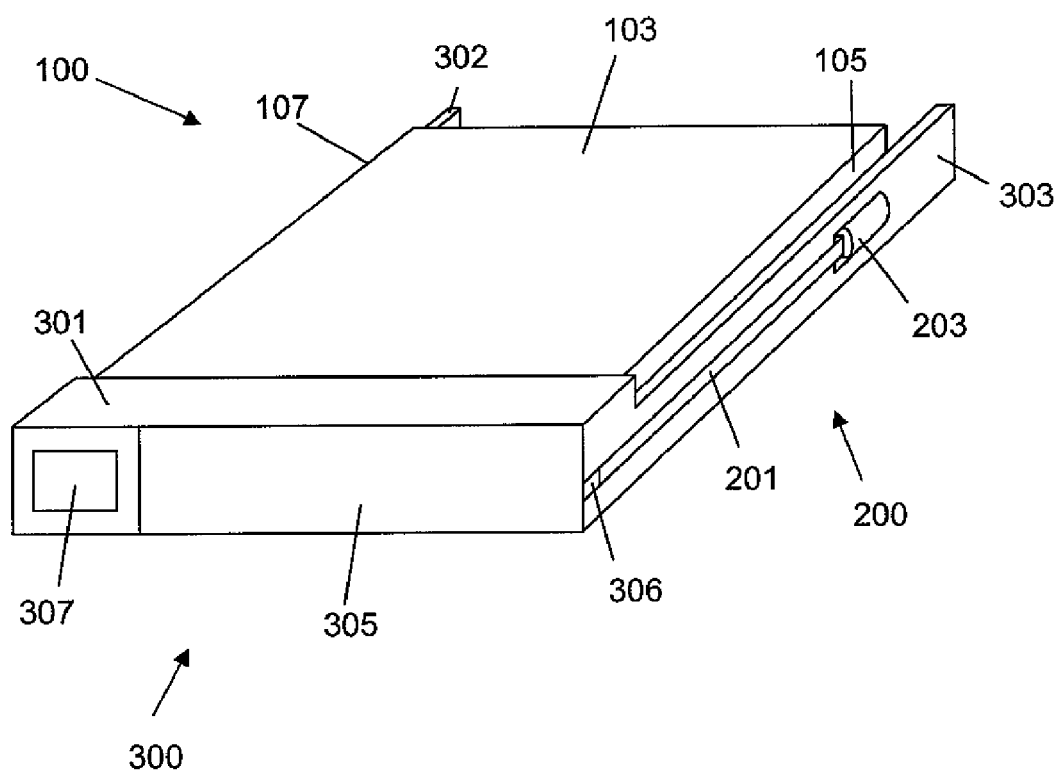
FIG. 4 shows a perspective view of a HDD having a HDD damping mechanism with the HDD bracket lever in the closed position according to one or more embodiments of the present invention.

FIGS. 3 and 4 show a HDD 100 having a HDD damping mechanism 200 according to one or more embodiments of the present invention. The HDD 100 has a top surface 103, and side surfaces 105, 107. The HDD 100 is disposed within a HDD bracket 300.

The HDD 100 is disposed between left and right side bracket portions 302, 303 of the HDD bracket 300, and behind a front bezel 301 of the HDD bracket 300. The HDD 100 may be attached to the HDD bracket 100, for example, by screws. A HDD bracket lever 305 is disposed at a front portion of the front bezel 301, and is rotatably fixed about a corner of the front bezel 301.

FIG. 3 shows the HDD bracket lever 305 of the HDD bracket 300 in the open position, while FIG. 4 shows the HDD bracket lever 305 of the HDD bracket 300 in the closed position. The HDD bracket 300 can be inserted into a drive cage within a computer server rack when the HDD bracket lever 305 is in the open position. After insertion, the HDD bracket lever 305 is pushed into the closed position, which secures the HDD bracket 300 within the drive cage. A release button 307 disposed on the front of the front bezel 301, when pressed while the HDD bracket lever 305 is secured within the drive cage in the closed position, releases the HDD bracket lever 305 into the open position, and the HDD bracket 300 can be easily removed from the drive cage.

As shown in FIGS. 3 and 4, a HDD damping mechanism 200 is disposed on the right side bracket 303 of the HDD bracket 300. The HDD damping mechanism 200 includes a movable actuation mechanism 201 in the form of a rod slidably disposed within and running parallel to the right side bracket 303, and a compressible insert 203 disposed within the right side bracket 303 at a back distal end of the actuation mechanism 201. The compressible insert 203 may be an elastomer, or any other flexible material capable of reversible deformation under stress.

As shown in FIG. 4, a push piece 306 is attached to the HDD bracket lever 305 such that when the HDD bracket lever 305 is in the closed position, the push piece 306 pushes against a front distal end of the actuation mechanism 201 and slides the actuation mechanism 201 backwards, which, in turn, creates a pressure on the front surface of the compressible insert 203 such that the compressible insert 203 is compressed.

FIG. 5(a) shows a top cross-sectional view of the HDD damping mechanism 200 when the HDD bracket lever 305 is in the open position, and FIG. 5(b) shows a top cross-sectional view of the HDD damping mechanism 200 when the HDD bracket lever 305 is in the closed position.

As shown in FIGS. 5(a) and 5(b), the compressible insert 203 has on the front surface a front locking tongue 205 which attaches to a correspondingly shaped surface on the back of the actuation mechanism 201, and has on the back surface a back locking tongue 207 which attaches to a correspondingly shaped surface on the right side bracket 303. The shape of the front and back locking tongues 205, 207 prevents the compressible insert 203 from becoming laterally dislodged.

As shown in FIG. 5(a), when the HDD bracket lever 305 is in the open position, the actuation mechanism 201 is exerting no pressure on the compressible insert 203. As shown in FIG. 5(b), when the HDD bracket lever 305 is in the closed position, the actuation mechanism 201 is pushed backwards by the push piece 306 such that the back surface of the actuation mechanism 201 exerts pressure on the front surface of the compressible insert 203, thereby compressing the compressible insert 203. Because the compressible insert 203 is abutted by the actuation mechanism 201, the side surface 105 of the HDD 100, and the right side bracket 303 on all but the right side, the compressible insert 203 expands outwards in the rightward direction and protrudes from the right side bracket 303. The protruding compressible insert 203 pushes outward against the inner wall of the drive cage in which the HDD bracket 300 is disposed, such that only the compressible insert 203 contacts the inner surface of the drive cage on the right side. The compressible insert 203 acts as a damper, and absorbs vibrations that would normally be translated to the HDD 100 from the drive cage. At the same time, the compressible insert 203 prevents any relative horizontal and/or vertical movement with respect to the drive cage, thus preventing throughput degradation.

In one or more embodiments of the present invention, the HDD damping mechanism 200 may be disposed on the left side bracket 302, or on both the left and right side brackets 302, 303. Disposing the HDD damping mechanism 200 on the left side would require that the HDD bracket lever 305 be disposed on the left hand side of the front surface of the front bezel 301. Disposing the HDD damping mechanism 200 on both the left and right side brackets 302, 303 would require a separate push piece 306 for the left side bracket 302. In one or more embodiments of the present invention, an elastomer piece could be attached to the left side bracket 302, such that when the HDD damping mechanism 200 on the right side bracket 303 is activated, the computer server bracket contacts the elastomer piece on the left side bracket 302 and the compressible insert 203 on the right side bracket 303, such that damping occurs on both sides.

One or more embodiments of the present invention has the advantage of providing vibration damping without affecting ease of insertion and removal of the HDD bracket 300, because the damper is uncompressed until the latch is closed.

One or more embodiments of the present invention has the advantage of providing vibration damping without requiring modifications to the drive cage into which the HDD bracket 300 is inserted.

One or more embodiments of the present invention has the advantage of providing a low-cost, easily implemented vibration damper within the tight tolerances of the drive cage.

One or more embodiments of the present invention has the advantage of suppressing relative motion of the HDD bracket 300 with respect to the drive cage.

One or more embodiments of the present invention has the advantage of improvement in the disk throughput performance.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A Hard Disk Drive ("HDD") bracket comprising:
 a HDD bracket lever having an open position and a closed position;
 a side bracket; and
 an HDD bracket damping mechanism comprising:
  an actuation mechanism slidably disposed within, and disposed parallel to, the side bracket, and
  a compressible insert disposed within the side bracket, and having a surface abutting the actuation mechanism,
 wherein when the HDD bracket lever is in the closed position, the actuation mechanism exerts pressure on the compressible insert such that the compressible insert protrudes from the side bracket.

2. The HDD bracket of claim 1, wherein the actuation mechanism is a rod, a back distal end of which abuts against the compressible insert.

3. The HDD bracket of claim 1, wherein a push piece attached to the HDD bracket lever is configured to push the actuation mechanism backwards when the HDD bracket lever is in the closed position.

4. The HDD bracket of claim 2, wherein a push piece attached to the HDD bracket lever is configured to push against a front distal end of the actuation mechanism when the HDD bracket lever is in the closed position, such that the actuation mechanism is moved towards the compressible insert.

5. The HDD bracket of claim 1, wherein the compressible insert comprises a first locking tongue attached to the actuation mechanism, and a second locking tongue attached to the side bracket, wherein the first and second locking tongues prevent the compressible insert from becoming dislodged.

6. The HDD bracket of claim 1, wherein the compressible insert is an elastomer.

7. The HDD bracket of claim 1, further comprising a second side bracket, wherein an HDD is disposed between the first and second side brackets.

8. The HDD bracket of claim 1, wherein when the HDD bracket is configured to be secured within a drive cage when the HDD bracket lever is in the closed position, and is configured to be released from a computer server rack when the HDD bracket is in the open position.

9. The HDD bracket of claim 1, further comprising a release button disposed on a front bezel of the HDD bracket, wherein the HDD bracket lever is configured to open into the open position when the release button is pressed.

* * * * *